United States Patent
Yueh

(10) Patent No.: US 7,212,192 B2
(45) Date of Patent: May 1, 2007

(54) ELECTRONIC INPUT DEVICE

(76) Inventor: Wen Hsiang Yueh, 3F, No. 7-2, Lane 46, Chung Cheng St., Hsinchuang City, Taipei Hsien (TW)

( * ) Notice: Subject to any disclaimer, the term of this patent is extended or adjusted under 35 U.S.C. 154(b) by 490 days.

(21) Appl. No.: 10/729,919

(22) Filed: Dec. 9, 2003

(65) Prior Publication Data
US 2005/0122316 A1    Jun. 9, 2005

(51) Int. Cl.
*G09G 5/00* (2006.01)
(52) U.S. Cl. .................. 345/173; 345/168; 178/18.01; 341/21
(58) Field of Classification Search ................ 345/173, 345/179, 168; 178/18.01, 18.03, 19.01; 341/21, 341/22
See application file for complete search history.

(56) References Cited

U.S. PATENT DOCUMENTS

| | | | |
|---|---|---|---|
| 5,565,657 A * | 10/1996 | Merz ....................... | 178/18.01 |
| 5,724,064 A * | 3/1998 | Stefik et al. ................ | 345/105 |
| 2003/0011576 A1* | 1/2003 | Sandbach et al. ........... | 345/173 |
| 2003/0071796 A1* | 4/2003 | Nakanishi et al. .......... | 345/173 |
| 2003/0107556 A1* | 6/2003 | Yamashita .................. | 345/173 |
| 2003/0206161 A1* | 11/2003 | Liu et al. .................... | 345/173 |
| 2004/0027340 A1* | 2/2004 | Muraoka et al. ............ | 345/173 |

* cited by examiner

*Primary Examiner*—Richard Hjerpe
*Assistant Examiner*—Kimnhung Nguyen
(74) *Attorney, Agent, or Firm*—Rosenberg, Klein & Lee

(57) ABSTRACT

A thin electronic input device has a film layer, a conducting layer, a covering layer, character display layer, an IC control unit and a connecting unit. The film layer is made of a flexible material. The conducting layer is mounted on the film layer for sensing a human pulse wave. The covering layer is mounted on the conducting layer. The character display layer is mounted on the covering layer; furthermore, the character display layer also has a plurality of keyboard characters printed thereon. The IC control unit is electrically connected to the conducting layer. The connecting unit is electrically connected to the conducting layer. When a user touches the character display layer to provide a human pulse wave, the conducting layer receives a touch signal for inputting information.

13 Claims, 4 Drawing Sheets

ELECTRONIC INPUT DEVICE

BACKGROUND OF THE INVENTION (1). Field of the Invention

The present invention relates to a thin electronic input device, and more particularly to a thin electronic input device mounted on a PDA (mobile phone or tablet PC) for inputting a lot of information.

(2). Description of the Related Art

Personal digital assistants, or PDA's, are handheld devices that are capable of performing various functions of personal computers and cellular phones depending upon the model or style of PDA.

A PDA may be used for wireless communication, like a cellular phone, to send and receive electronic mail. A PDA may also be used to store and display calendars, addresses and telephone numbers, to-do lists, and other electronic information. Commonly, a PDA will include control buttons or a touch screen that may be activated by a separate handheld stylus to activate certain functions. The stylus can be used to input information for the purposes of sending electronic mail or entering data related to the stored and displayed information.

A PDA (Personal Digital Assistant) is thus a very popular electronic product. A PDA has a volume smaller than a notebook easy portability. A lot of information often used by people can be stored in the PDA. Now people can immediately find information for greater convenience.

Reference is made to FIG. 1, which illustrates a conventional electronic device 100 such as a PDA (mobile phone or tablet PC) having a touch screen 101 and a stylus 102. An area of the touch screen 101 is too small so that the touch screen 101 is not easily operated. Besides, a recognition rate of the touch screen 101 is suboptimal, so input of large quantities of information is inconvenient. A keyboard can be combined with a PDA for inputting a lot of information, but the keyboard is big and the PDA is then not easily carried.

Therefore, according to above descriptions, the conventional electronic device 100 such as a PDA (mobile phone or tablet PC) still has some issues of inconvenience, which need to be improved.

SUMMARY OF THE INVENTION

The object of the present invention is to provide a thin electronic input device. After expanding the thin electronic input device, the thin electronic input device has a bigger operating area. Keyboard characters on the character display layer can be touched easily so that the thin electronic input device has a better recognition rate and is conveniently operated. When the thin electronic input device is not in use, it can be elastically rolled in an inner chamber of the electronic device for greater portability, or be rolled on an exterior of the electronic device.

In order to achieve the above object, the present invention provides a thin electronic input device having a film layer, a conducting layer, a covering layer, character display layer, an IC control unit and a connecting unit.

The film layer is made of a flexible material. The conducting layer is mounted on the film layer for sensing a human pulse wave. The covering layer is mounted on the conducting layer. The character display layer is mounted on the covering layer; furthermore, the character display layer also has a plurality of keyboard characters printed thereon. The IC control unit is electrically connected to the conducting layer. The connecting unit is electrically connected to the conducting layer.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF THE DRAWINGS

The various objects and advantages of the present invention will be more readily understood from the following detailed description when read in conjunction with the appended drawing, in which.

DETAILED DESCRIPTION OF PREFERRED EMBODIMENTS

Figure 1:
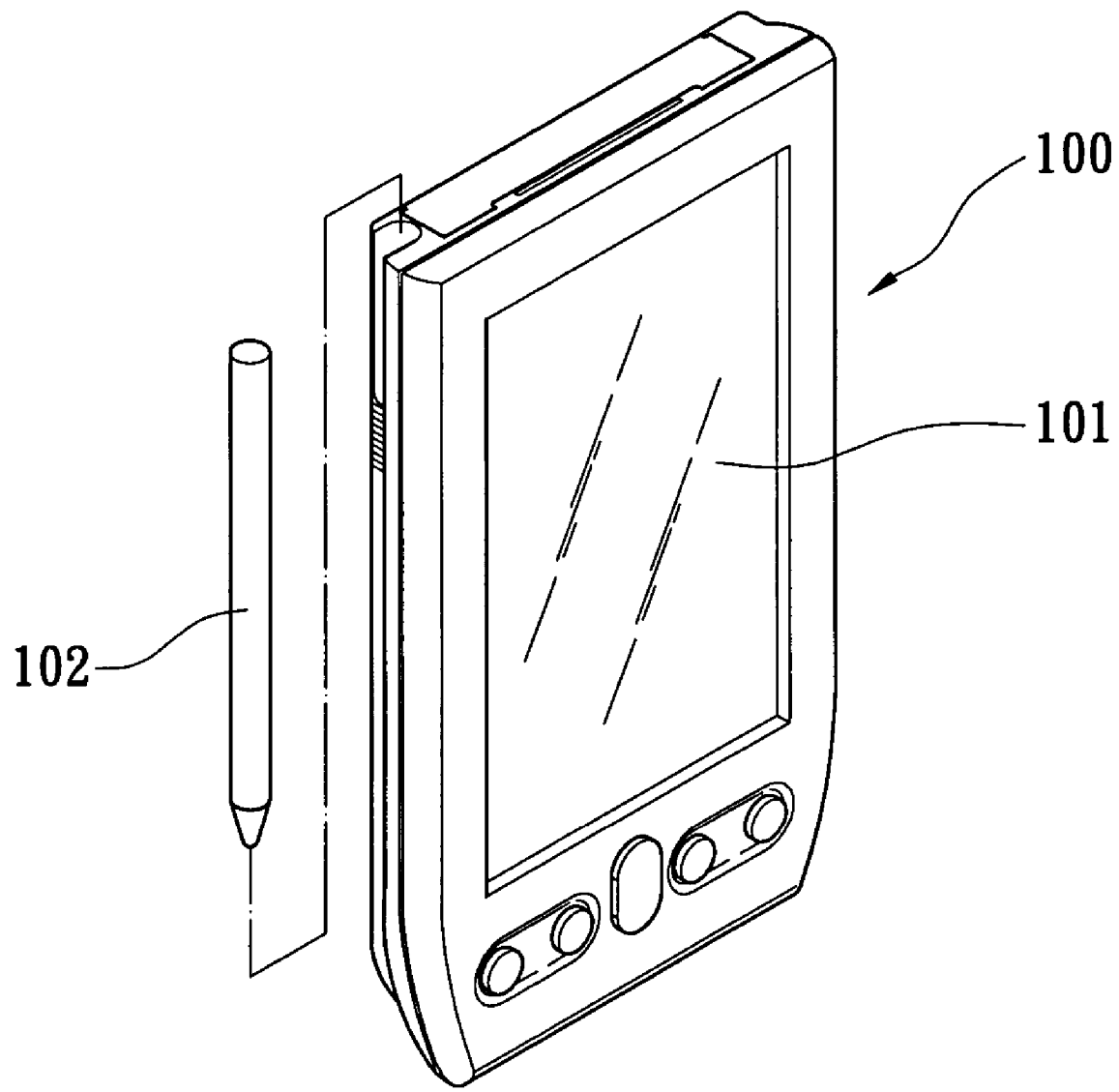
FIG. 1 is a perspective view of the prior art electronic device.
Figure 2:
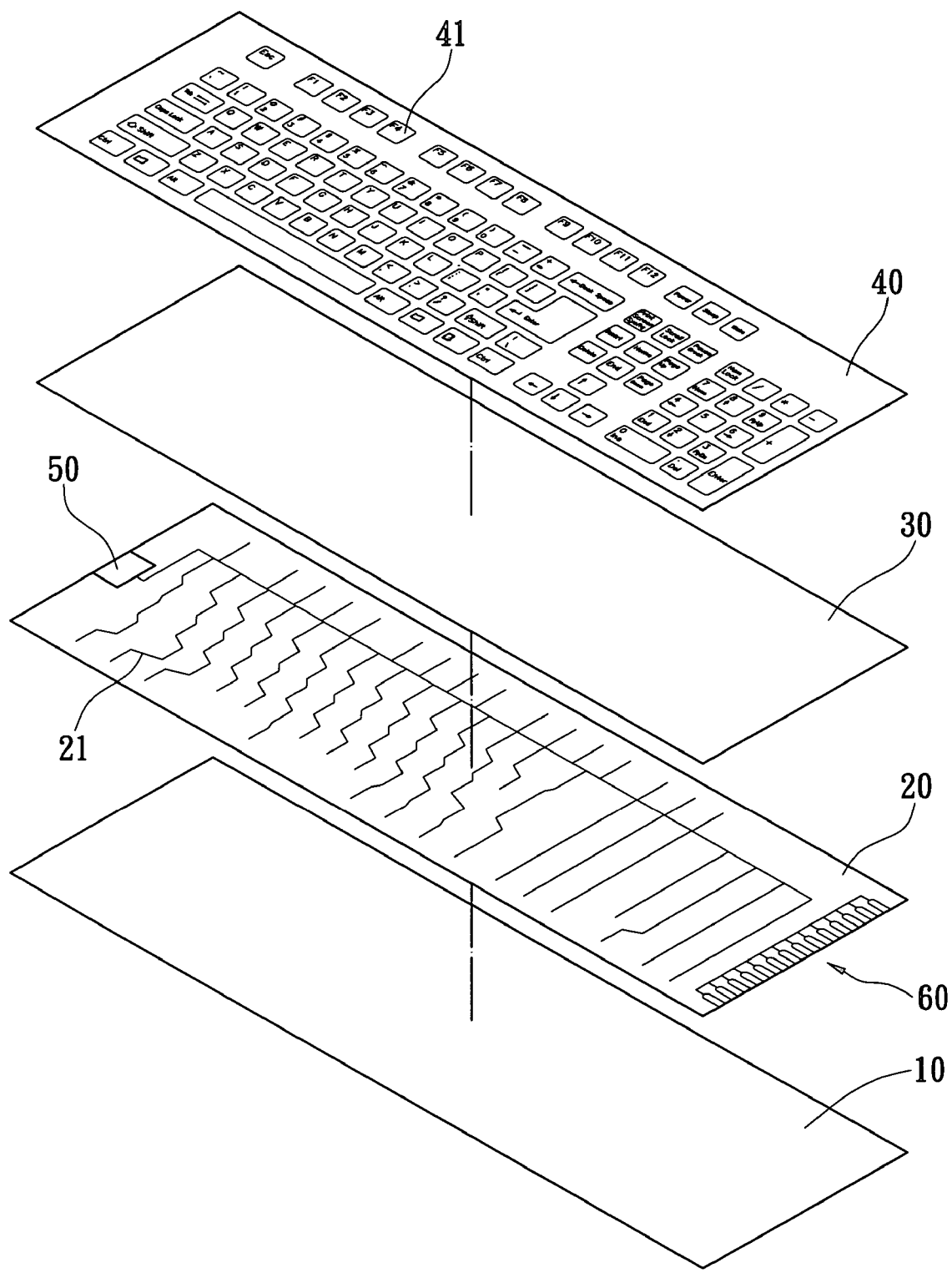
FIG. 2 is an exploded view of the present invention.
Figure 3:
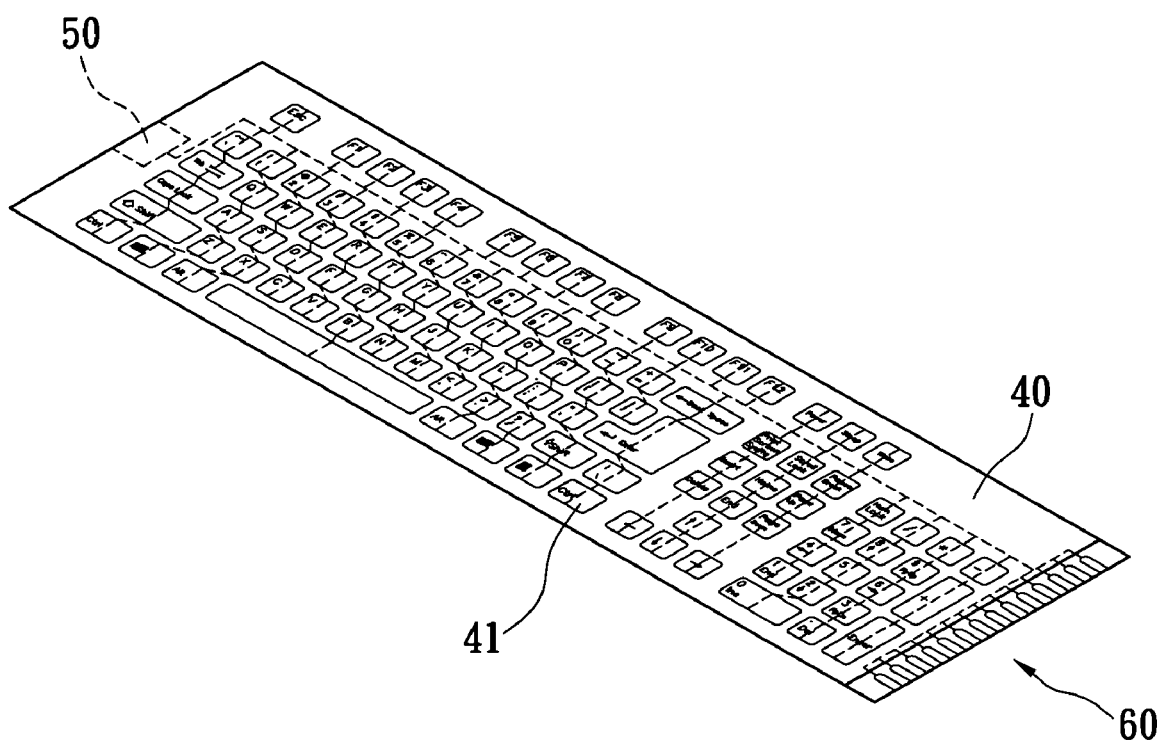
FIG. 3 is a perspective view of the present invention.

Reference is made to FIG. 2 and 3. The present invention provides a thin electronic input device having a film layer 10, a conducting layer 20, a covering layer 30, character display layer 40, an IC control unit 50 and a connecting unit 60.

The film layer 10 is made of a flexible material such as a paper or a non-woven cloth; moreover, the film layer 10 is disposed below the conducting layer 20. The conducting layer 20 is mounted on the film layer 10; besides, the conducting layer 20 further has a conducting track 21 formed thereon. The covering layer 30 is made of a flexible material and mounted on the conducting layer 20 for protecting the conducting track 21 of the conducting layer 20. The character display layer 40 is made of a flexible material and mounted on the covering layer 30; furthermore, the character display layer 40 further has a plurality of keyboard characters 41, such as the English alphabet or numbers, printed thereon.

The IC control unit 50 is mounted on the conducting layer 20 and the IC control unit 50 is electrically connected to the conducting layer 20. Besides, the IC control unit 50 is also built in the electronic device 70. The connecting unit 60 is disposed on a side of the conducting layer 20 and the connecting unit 60 is electrically connected with the conducting layer 20. The connecting unit 60 is electrically fixed on a circuit of the electronic device 70 or the connecting unit 60 is separably electrically connected to a circuit of the electronic device 70.

The film layer 10, the conducting layer 20, the covering layer 30 and the character display layer 40 are stacked and combined together for forming into the thin electronic input device.

Figure 4:
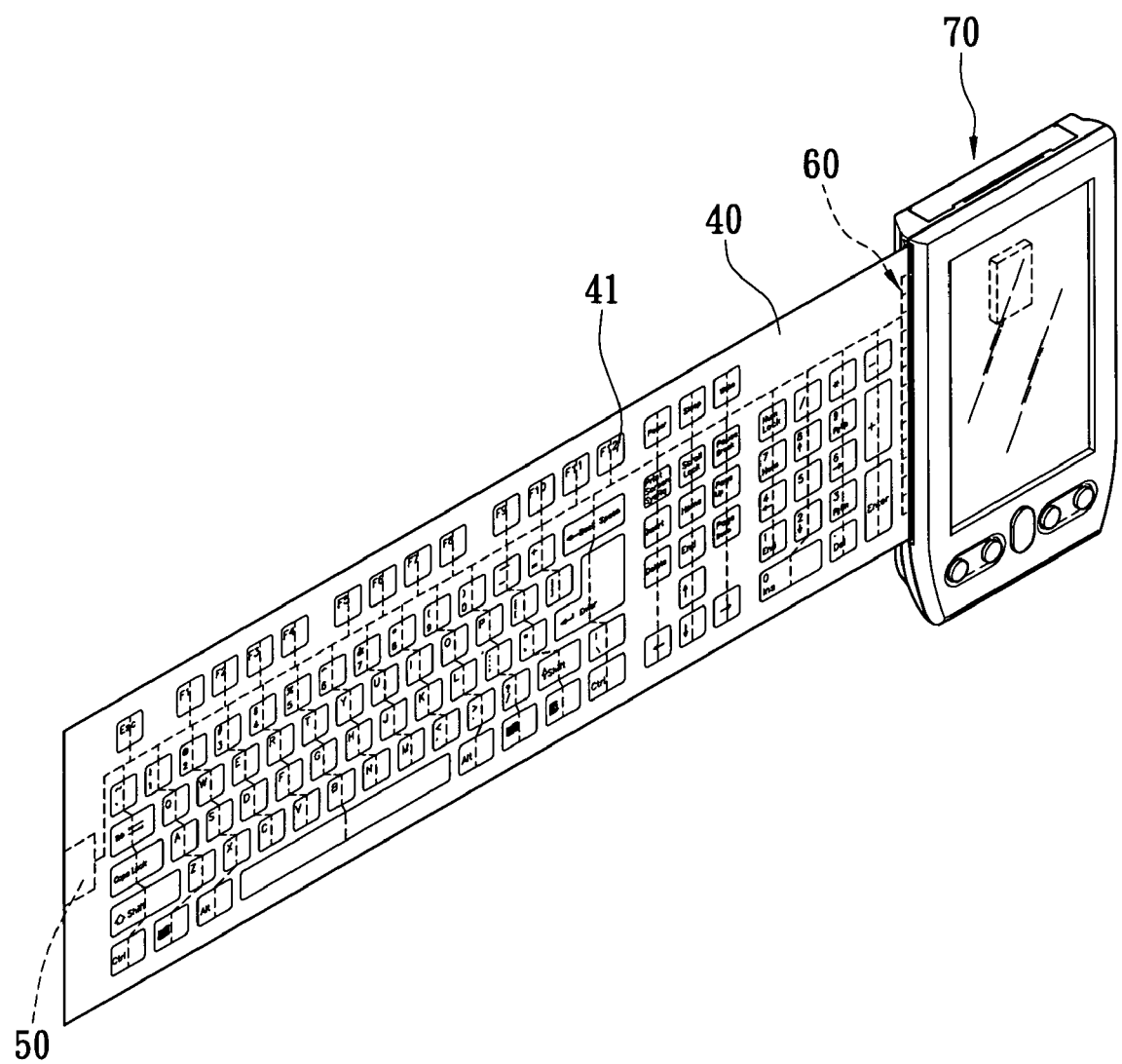
FIG. 4 shows that the present invention mounted on the electronic device.

Reference is made to FIG. 4, in which the thin electronic input device of the present invention is mounted on electronic device 70 such as a PDA, a mobile phone or a tablet PC. The thin electronic input device is elastically rolled in an inner chamber of the electronic device 70 or rolled on an exterior of the electronic device 70 for greater portability. When a user touches the characters 41 of the character display layer 40 to provide a human pulse wave of about 50 Hz–60 Hz, the conducting layer 20 receives a touch signal for inputting information.

After the thin electronic input device is expanded, it has a bigger operating area on which the characters 41 of the character display layer 40 can be easily touched. According to the above descriptions, the present invention has following advantages:

(1) The present invention has a better recognition rate.

(2) The input method of the present invention is the same as that of a keyboard, so that the present invention is very convenient for inputting a lot of information.

Although the present invention has been described with reference to the preferred embodiment thereof, it will be understood that the invention is not limited to the details thereof. Various substitutions and modifications have suggested in the foregoing description, and others will occur to those of ordinary skill in the art. Therefore, all such substitutions and modifications are intended to be embraced within the scope of the invention as defined in the appended claims.

What is claimed is:

1. A thin electronic input device, comprising:
    a film layer made of a flexible material;
    a single conducting layer mounted on said film layer for sensing a human electrical wave having a frequency between fifty and sixty hertz;
    a covering layer mounted on said conducting layer;
    a character display layer mounted on said covering layer, said character display layer having a plurality of keyboard characters printed thereon, said conducting, covering, and character layers being non-displaceably mounted respectively on said film layer;
    an IC control unit electrically connecting to said conducting layer;
    and a connecting unit electrically connecting to said conducting layer whereby said human electrical wave provides electrical input to said electronic input device when contacted by a carrier of said human electrical wave.

2. The thin electronic input device as claimed in claim 1, wherein the film layer is made of paper.

3. The thin electronic input device as claimed in claim 1, wherein the film layer is made of non-woven cloth.

4. The thin electronic input device as claimed in claim 1, wherein the IC control unit is mounted on the conducting layer.

5. A thin electronic input device mounted on an electronic device, comprising:
    a film layer made of a flexible material;
    a single conducting layer mounted on said film layer for sensing a human electrical wave having a frequency between fifty and sixty hertz;
    a covering layer mounted on said conducting layer;
    a character display layer mounted on said covering layer, wherein said character display layer has a plurality of keyboard characters printed thereon, said conducting, covering, and character layers being non-displaceably mounted respectively on said film layer;
    an IC control unit electrically connecting to said conducting layer; and
    a connecting unit electrically connecting to said conducting layer and the electronic device whereby said human electrical wave provides electrical input to said electronic input device when contacted by a carrier of said human electrical wave.

6. The thin electronic input device as claimed in claim 5, wherein the film layer is made of paper.

7. The thin electronic input device as claimed in claim 5, wherein the film layer is made of a non-woven cloth.

8. The thin electronic input device as claimed in claim 5, wherein the IC control unit is mounted on the conducting layer.

9. The thin electronic input device as claimed in claim 5, wherein the IC control unit is built in the electronic device.

10. The thin electronic input device as claimed in claim 5, wherein the connecting unit is electrically fixed on a circuit of the electronic device.

11. The thin electronic input device as claimed in claim 5, wherein the connecting unit is separably electrically connected to a circuit of the electronic device.

12. The thin electronic input device as claimed in claim 5, wherein the thin electronic input device is elastically rolled in an inner chamber of the electronic device.

13. The thin electronic input device as claimed in claim 5, wherein the thin electronic input device is elastically rolled on an exterior of the electronic device.

* * * * *